(12) United States Patent
Uozumi et al.

(10) Patent No.: US 10,488,272 B2
(45) Date of Patent: Nov. 26, 2019

(54) TEMPERATURE SENSOR

(71) Applicant: MITSUBISHI MATERIALS CORPORATION, Tokyo (JP)

(72) Inventors: Gakuji Uozumi, Naka (JP); Noriaki Nagatomo, Naka (JP)

(73) Assignee: MITSUBISHI MATERIALS CORPORATION, Tokyo (JP)

(*) Notice: Subject to any disclaimer, the term of this patent is extended or adjusted under 35 U.S.C. 154(b) by 0 days.

(21) Appl. No.: 16/070,321

(22) PCT Filed: Jan. 23, 2017

(86) PCT No.: PCT/JP2017/002164
§ 371 (c)(1),
(2) Date: Jul. 16, 2018

(87) PCT Pub. No.: WO2017/130913
PCT Pub. Date: Aug. 3, 2017

(65) Prior Publication Data
US 2019/0078942 A1   Mar. 14, 2019

(30) Foreign Application Priority Data
Jan. 29, 2016  (JP) .................................. 2016-016161

(51) Int. Cl.
*G01K 7/22*  (2006.01)
(52) U.S. Cl.
CPC ..................................... *G01K 7/22* (2013.01)
(58) Field of Classification Search
CPC ...................................................... G01K 7/22
See application file for complete search history.

(56) References Cited

U.S. PATENT DOCUMENTS

| 6,342,295 B1* | 1/2002 | Kobayashi | ........... G01N 27/121 |
| | | | 338/35 |
| 2015/0036723 A1* | 2/2015 | Fujita | ...................... H01C 7/04 |
| | | | 374/185 |

(Continued)

FOREIGN PATENT DOCUMENTS

| CN | 101995304 A | 3/2011 |
| JP | 50-030571 A | 3/1975 |

(Continued)

OTHER PUBLICATIONS

JP09-184770, Hasumi, Jul. 1997 (machine translation). (Year: 1997).*

(Continued)

*Primary Examiner* — Kyung S Lee
(74) *Attorney, Agent, or Firm* — Locke Lord LLP

(57) ABSTRACT

A temperature sensor having excellent humidity resistance and responsivity is provided. The temperature sensor according to the present invention includes an insulating substrate 2; a thin film thermistor portion 3 made of a thermistor material formed on either surface of the insulating substrate; and an opposed electrode pair 5 consisting of a pair of opposed electrodes 4 formed so as to be opposed to each other on at least either one of the top and bottom surfaces of the thin film thermistor portion, wherein a plurality of the opposed electrode pairs are provided and connected to one another in series. As a result, a voltage applied to a unit thermistor composed of one opposed electrode pair becomes 1/n fold, which can suppress the electrode corrosion due to humidity load.

4 Claims, 4 Drawing Sheets

(56) References Cited

U.S. PATENT DOCUMENTS

| | | | | |
|---|---|---|---|---|
| 2015/0049788 A1* | 2/2015 | Fujita | ............... | C23C 14/0676 |
| | | | | 374/185 |
| 2015/0171489 A1* | 6/2015 | Inaba | ............... | H01M 10/486 |
| | | | | 429/61 |
| 2015/0337433 A1* | 11/2015 | Fujita | ............... | G01K 7/22 |
| | | | | 374/185 |
| 2015/0362381 A1* | 12/2015 | Nagatomo | ............... | G01K 7/22 |
| | | | | 257/467 |
| 2016/0211059 A1* | 7/2016 | Fujita | ............... | H01O 17/12 |

FOREIGN PATENT DOCUMENTS

| | | | |
|---|---|---|---|
| JP | 50-120993 A | 9/1975 |
| JP | 62-291001 A | 12/1987 |
| JP | 09-184770 A | 7/1997 |
| JP | 2010-277054 A | 12/2010 |
| JP | 2014-052228 A | 3/2014 |

OTHER PUBLICATIONS

International Search Report dated Apr. 18, 2017, issued for PCT/JP2017/002164 and English translation thereof.
Office Action dated Jul. 15, 2019, issued for the Chinese Patent Application No. 201780004054.7 and English translation thereof.
Office Action dated Oct. 8, 2019, issued for Japanese Patent Application No. 2016-016161 and English translation thereof.

* cited by examiner

[FIG.1]
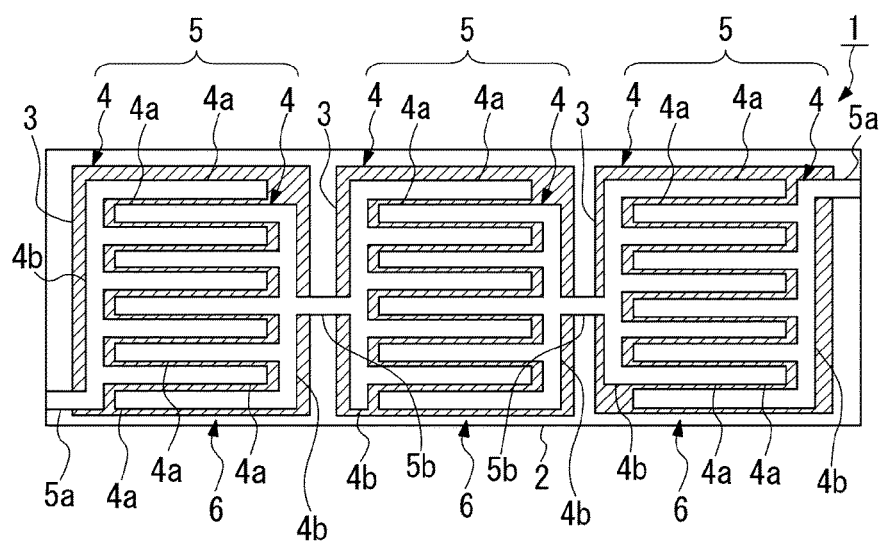

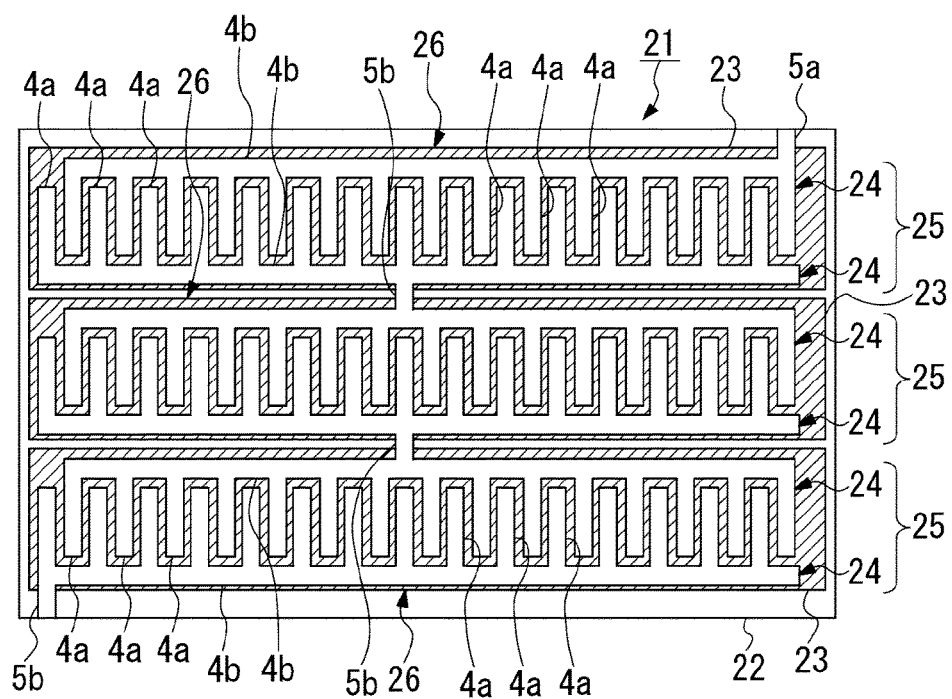

[FIG.3]
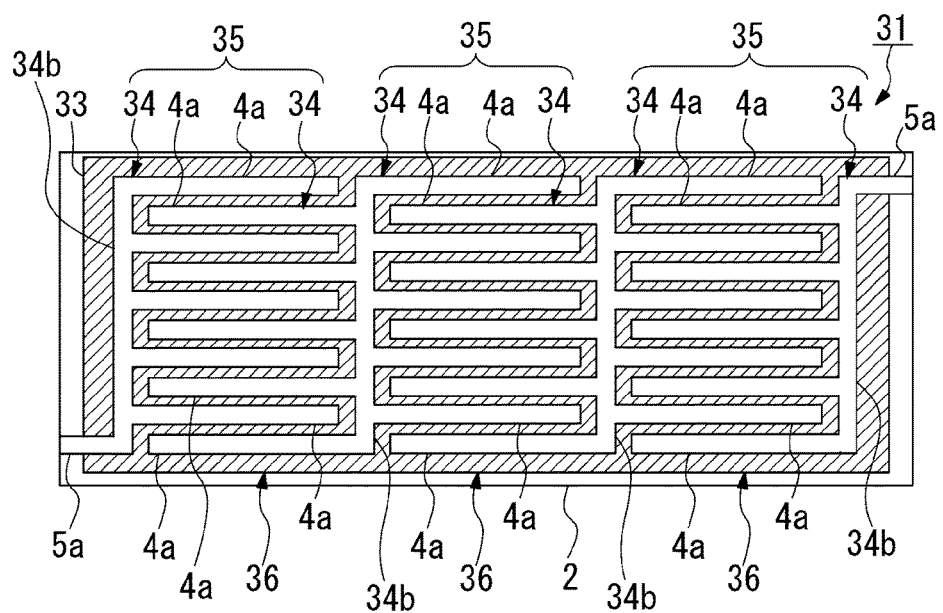

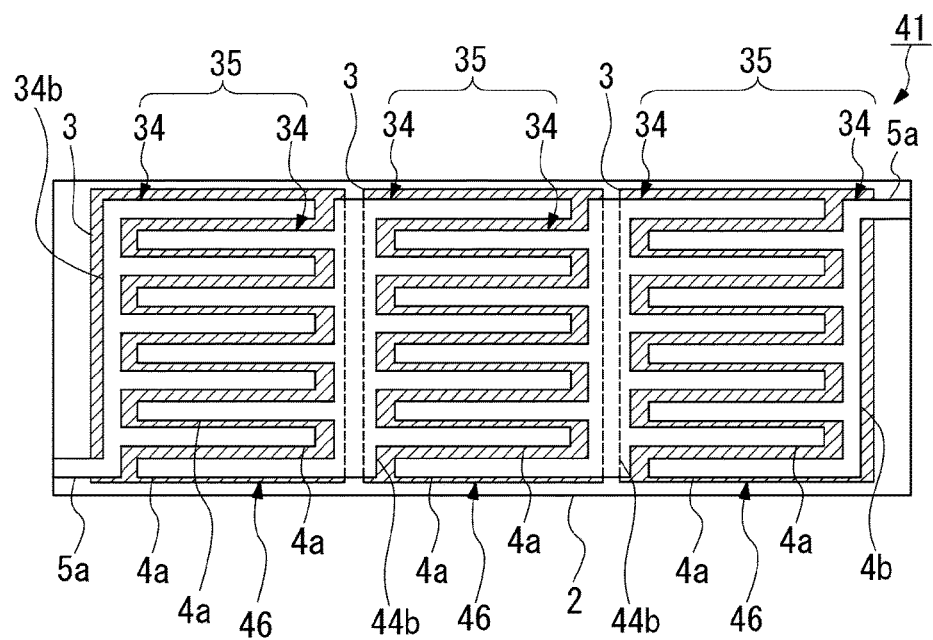
[FIG.4]

TEMPERATURE SENSOR

BACKGROUND OF THE INVENTION

Field of the Invention

The present invention relates to a temperature sensor that is suitable for measuring a temperature of an onboard part, a fuser roller used in a copying machine, or the like and that has excellent humidity resistance and responsivity.

Description of the Related Art

In general, a temperature sensor is provided in contact with an onboard part, a fuser roller (heated roller) used in an image-forming apparatus such as a copying machine, or the like in order to measure the temperature of the roller. Such a temperature sensor is disclosed in, for example, Patent document 1, which is a temperature sensor for a fuser in which a glass-sealed thermistor element is placed on a thin glass plate, and they were sandwiched from above and below by insulating sheets.

This temperature sensor for a fuser employs a polyimide resin or fluororesin for the insulating sheets.

In recent years, a film type thermistor sensor has been developed in which a thin film thermistor is formed on an insulating film so that the sensor can have an excellent flexibility and a thin profile as a whole. For example, Patent document 2 discloses a temperature sensor that includes a pair of lead frames, a sensor portion connected to the pair of lead frames, and an insulating holding portion fixed to the pair of lead frames for holding the lead frames.

In this temperature sensor, a sensor portion includes an insulating film, a thin film thermistor portion made of a thermistor material that is patterned on a surface of the insulating film, a pair of comb shaped electrodes that is patterned so as to be opposed to each other and to have a plurality of comb portions on at least either one of the top and bottom surfaces of the thin film thermistor portion, and a pair of pattern electrodes that is connected to the pair of comb shaped electrodes and is patterned on a surface of the insulating film, wherein a pair of lead frames extend on and are adhered to the surface of the insulating film with the thin film thermistor portion being arranged between thereof and are connected to the pair of pattern electrodes.

PRIOR ART DOCUMENTS

Patent Documents

[Patent Document 1] Japanese Unexamined Patent Application Publication No. 2010-277054
[Patent Document 2] Japanese Unexamined Patent Application Publication No. 2014-52228

SUMMARY OF THE INVENTION

Problems to be Solved by the Invention

The following problems still remain in the conventional technologies described above.

When a temperature of an onboard part is measured and when a temperature is measured by pressing a temperature sensor against a fuser roller or the like, the sensor can be exposed to a high temperature and humidity external environment, which may cause changes in its characteristics (e.g. its electrical properties or the like). In order to avoid such changes, conventionally the surface on the side of a heat sensitive element is covered with an insulating sheet made of a polyimide resin, fluororesin, or the like. However, a thick insulating sheet must be employed in order to ensure enough humidity resistance, which may increase the heat capacity. As a consequence, the thermal conductivity from the fuser roller to the heat sensitive element can be decreased, which may disadvantageously lower the responsivity. Specifically, since an organic polymer such as polyimide resin, fluororesin, or the like constituting the insulating sheet has a water vapor permeability coefficient that is not enough low, the insulating sheet is required to have a thickness of at least several tens of μm in order to withstand the prolonged use under a high temperature and humidity external environment.

The present invention has been made in view of the aforementioned circumstances, and an object of the present invention is to provide a temperature sensor having excellent humidity resistance and responsivity.

Means for Solving the Problems

The present invention adopts the following configuration in order to overcome the aforementioned problems. Specifically, a temperature sensor according to a first aspect of the present invention comprises an insulating substrate; a thin film thermistor portion made of a thermistor material formed on either side of the insulating substrate; and an opposed electrode pair consisting of a pair of opposed electrodes formed so as to be opposed to each other on at least either one of the top and bottom surfaces of the thin film thermistor portion, wherein a plurality of the opposed electrode pairs are provided and connected to one another in series.

In the temperature sensor according to the first aspect of the present invention, since the plurality of opposed electrode pairs are provided and connected to one another in series, if n opposed electrode pairs are connected in series for example, a voltage applied to a unit thermistor composed of one opposed electrode pair becomes 1/n fold, which can suppress the electrode corrosion due to humidity load. Therefore, even if it is used under a high temperature and humidity environment for a long period of time, the deterioration of the thermistor characteristics can be suppressed. Moreover, since the thickness of the insulating sheet or the like needs not to be increased more than necessary, reduction in the temperature detecting speed can be suppressed without causing the heat capacity to be increased.

A temperature sensor according to a second aspect of the present invention is characterized by the temperature sensor according to the first aspect of the present invention, wherein the insulating substrate is an insulating film, a plurality of the thin film thermistor portions are formed so as to be spaced apart from one another, and one of the opposed electrode pairs is provided for each of the thin film thermistor portions.

Specifically, in this temperature sensor, since the insulating substrate is an insulating film, a plurality of the thin film thermistor portions are formed so as to be spaced apart from one another, and one of the opposed electrode pairs is provided for each of the thin film thermistor portions, an effect on the thin film thermistor portions caused by bending the sensor can be suppressed by bending it at a portion which does not include any of the thin film thermistor portions, that is, between the adjacent thin film thermistor portions in the insulating film. As a result, a flexible film type sensor having a high bendability can be obtained.

A temperature sensor according to a third aspect of the present invention is characterized by the temperature sensor according to a first or second aspect, wherein the opposed electrodes have a plurality of comb portions and joints for connecting the base ends of the plurality of comb portions, and the adjacent opposed electrode pairs are connected through the same one joint shared by the pairs.

Specifically, in this temperature sensor, since the adjacent opposed electrode pairs are connected to each other through the same one joint shared by the pairs, a connecting wiring portion is not required to connect the adjacent opposed electrode pairs to each other in series, resulting in a temperature sensor having a small profile.

Effects of the Invention

According to the present invention, the following effects may be provided.

Specifically, according to the temperature sensor of the present invention, since the plurality of opposed electrode pairs are provided and connected to one another in series, a voltage applied to a unit thermistor composed of one opposed electrode pair is decreased, which can suppress the electrode corrosion due to humidity load. Moreover, since a thin insulating sheet can be employed, reduction in the temperature detecting speed can be suppressed.

Therefore, the temperature sensor of the present invention is suitable for measuring a temperature of an onboard part, a fuser roller used in a copying machine, or the like which is required to have high humidity resistance and responsivity.

BRIEF DESCRIPTION OF THE DRAWINGS

FIG. 1 is a plan view showing a temperature sensor according to a first embodiment of the present invention.

FIG. 2 is a plan view showing a temperature sensor according to a second embodiment of the present invention.

FIG. 3 is a plan view showing a temperature sensor according to a third embodiment of the present invention.

FIG. 4 is a plan view showing a temperature sensor according to a fourth embodiment of the present invention.

DESCRIPTION OF THE EMBODIMENTS

Hereinafter, a temperature sensor according to a first embodiment of the present invention will be described with reference to FIG. 1. In a part of the drawings referenced in the following description, the scale of each component may be changed as appropriate so that each component is recognizable or is readily recognized.

As shown in FIG. 1, a temperature sensor 1 according to the present embodiment includes an insulating substrate 2, a thin film thermistor portion 3 made of a thermistor material formed on either side (surface) of the insulating substrate 2, and an opposed electrode pair 5 consisting of a pair of opposed electrodes 4 formed so as to be opposed to each other on the top surface of the thin film thermistor portion 3.

A plurality of the opposed electrode pairs 5 are provided and connected to one another in series.

Note that, in the present invention, either side of the insulating substrate 2 is referred to as the surface side or the top surface side.

The insulating substrate 2 is an insulating film in a rectangular shape.

A plurality of thin film thermistor portions 3 are formed so as to be spaced apart from one another, and one of the opposed electrode pairs 5 is provided for each of the thin film thermistor portions 3.

In the present embodiment, three of the thin film thermistor portions 3 in a generally square shape are connected side by side in series in the extending direction of the insulating substrate 2 so as to be spaced apart from one another.

Specifically, in the present embodiment, three of the opposed electrode pairs 5 are connected side by side in series in the extending direction of the insulating substrate 2. Therefore, one of the opposed electrode pairs 5 and the thin film thermistor portion 3 underlying thereof constitute a unit thermistor 6, and in the present embodiment, three of the unit thermistors 6 are connected side by side in series.

The opposed electrodes 4 have a plurality of comb portions 4a and joints 4b for connecting the base ends of the plurality of comb portions 4a. The opposed electrodes 4 are patterned so as to have a comb shape.

In addition, the opposed electrode pairs 5 adjacent to each other are connected through a connecting wiring portion 5b formed so as to bridge between the opposed respective joints 4b.

On the both ends of a set of the plurality of opposed electrode pairs 5 that is connected in series are provided connecting terminals 5a for external connections.

In addition, an insulating protection film may be formed on the insulating substrate 2 for covering the opposed electrode pairs 5 except for the connecting terminals 5a, and the thin film thermistor portions 3. This protection film is an insulating resin film or the like, and a polyimide film may be employed for example.

The insulating substrate 2 is, for example, a polyimide resin sheet formed in a belt shape having a thickness of 7.5 to 125 µm. The insulating substrate 2 may be made of another material such as polyethylene terephthalate (PET), polyethylene naphthalate (PEN), or the like, but a polyimide film is preferably used for measuring a temperature of a fuser roller since the maximum allowable working temperature is as high as 230° C.

The thin film thermistor portion 3 is made of, for example, a TiAlN thermistor material. In particular, the thin film thermistor portion 3 is made of a material consisting of a metal nitride represented by the general formula: $Ti_xAl_yN_z$ where $0.70 \leq y/(x+y) \leq 0.95$, $0.4 \leq z \leq 0.5$, and $x+y+z=1$, wherein the crystal structure thereof is a hexagonal wurtzite-type single phase.

Note that the thin film thermistor portion 3 is indicated by hatching in FIG. 1.

The opposed electrode pair 5 has a Cr or NiCr bonding layer having a film thickness of 5 to 100 nm formed on the thin film thermistor portion 3, and an electrode layer made of a noble metal such as Au or the like having a film thickness of 50 to 1000 nm formed on the bonding layer.

As described above, in the temperature sensor 1 according to the present embodiment, since the plurality of opposed electrode pairs 5 are provided and connected to one another in series, if n of the opposed electrode pairs 5 are connected in series for example, a voltage applied to the unit thermistor 6 composed of one of the opposed electrode pairs 5 becomes 1/n fold, which can suppress the electrode corrosion due to humidity load. Therefore, even if it is used under a high temperature and humidity environment for a long period of time, the deterioration of the thermistor characteristics can be suppressed. Moreover, since the thickness of the insulating sheet or the like needs not to be increased more than necessary, reduction in the temperature detecting speed can be suppressed without causing the heat capacity to be increased.

In addition, since the insulating substrate 2 is an insulating film, the plurality of thin film thermistor portions 3 are formed so as to be spaced apart from one another, and one of the opposed electrode pairs 5 is provided for each of the thin film thermistor portions 3, an effect on the thin film thermistor portions 3 caused by bending the sensor can be suppressed by bending it at a portion which does not include any of the thin film thermistor portions 3, that is, between the adjacent thin film thermistor portions 3 in the insulating film. As a result, a flexible film type sensor having a high bendability can be obtained.

Next, temperature sensors according to a second to fourth embodiments of the present invention will be described below with reference to FIGS. 2 to 4. Note that, in the following description of each embodiment, the same components as those in the first embodiment described above are denoted by the same reference numerals, and thus the description thereof is omitted.

The second embodiment is different from the first embodiment in the following points. In the first embodiment, three of the opposed electrode pairs 5 are connected in series side by side in the longitudinal direction of the insulating substrate 2 in a rectangular shape, whereas in a temperature sensor 21 according to the second embodiment, as shown in FIG. 2, three opposed electrode pairs 25 are connected in series side by side in the short-side direction of an insulating substrate 22 in a rectangular shape.

Specifically, in the second embodiment, the insulating substrate 22 has a rectangular shape in which the length in the short-side direction is longer than that in the first embodiment, and the joints 4b are formed along the longitudinal direction of the insulating substrate 22.

In addition, in the second embodiment, the number of the comb portions 4a in opposed electrodes 24 is larger than that in the first embodiment, and the length of the comb portion 4a is shorter.

Furthermore, each of the thin film thermistor portions 23 has a rectangular shape extending along the longitudinal direction of the insulating substrate 22 and is arranged in the short-side direction of the insulating substrate 22.

As described above, in the second embodiment, since the plurality of opposed electrode pairs 25 are connected to one another in series as in the first embodiment, a voltage applied to a unit thermistor 26 is decreased, which can suppress the electrode corrosion due to humidity load.

Next, the difference of a third embodiment from the first embodiment will be described below. In the first embodiment, the opposed electrode pairs 5 adjacent to each other are connected through the connecting wiring portion 5b, whereas in a temperature sensor 31 according to the third embodiment, as shown in FIG. 3, opposed electrode pairs 35 adjacent to each other are connected through the same one joint 34b shared by the pairs.

Specifically, in the third embodiment, the connecting wiring portion 5b is not provided, and therefore the joint 34b is shared by the opposed electrode pairs 35 adjacent to each other, and on each side of the joint 34b are extending the plurality of comb portions 4a.

In addition, in the first embodiment, three of the thin film thermistor portions 3 in a generally square shape are formed side by side and one of the opposed electrode pairs 5 is formed on each of the thin film thermistor portions 3, whereas in the third embodiment, three of the opposed electrode pairs 35 are formed on one thin film thermistor portion 33 in a rectangular shape. Specifically, three unit thermistors 36 that are connected in series are arranged on the one thin film thermistor portion 33.

As describe above, in the third embodiment, since the opposed electrode pairs 35 adjacent to each other are connected through the same one joint 34b shared by the pairs, the connecting wiring portion 5b is not required to connect the opposed electrode pairs 35 adjacent to each other in series, resulting in a temperature sensor having a small profile. In particular, the length in the direction where the opposed electrode pairs 35 are connected in series can be shorten. In addition, since the connecting wiring portion 5b is not provided, each comb portion 4a can be set to be longer.

Next, the difference of a fourth embodiment from the third embodiment will be described below. In the third embodiment, three of the opposed electrode pairs 35 are formed on the one thin film thermistor portion 33 in a rectangular shape, whereas in a temperature sensor 41 according to the fourth embodiment, as shown in FIG. 4, three of the thin film thermistor portions 3 in a generally square shape are formed side by side as in the first embodiment and one of the opposed electrode pairs 35 is formed on each of the thin film thermistor portions 3.

Therefore, in the fourth embodiment, the opposed electrode pairs 35 adjacent to each other are connected through a common joint 44b between the thin film thermistor portions 3 adjacent to each other. Accordingly, the width of the joint 44b is set to be broader than that in the third embodiment so as to fill the gap between the thin film thermistor portions 3 adjacent to each other.

As described above, in the fourth embodiment, since the plurality of thin film thermistor portions 3 are formed so as to be spaced apart from one another and the opposed electrode pairs 35 are provided for each of the thin film thermistor portions 3 as in the first embodiment, an effect on the thin film thermistor portions 3 caused by bending the sensor can be suppressed. As a result, a flexible film type sensor having a high bendability can be obtained.

Examples

Using a sensor according to Example 1 in which two unit thermistors (two opposed electrode pairs) are connected in series according to the first embodiment described above, a high temperature and humidity load test with a temperature of 85° C. and a relative humidity of 85% RH at a voltage of 2 V was carried out for 500 and 1000 hours to evaluate the electrode resistance value (R25). Also, a comparative evaluation test was carried out using a sensor including one unit thermistor only (one opposed electrode pair only) as Comparative Example 1.

These evaluation results showed that the electrode corroded in 500 hours and the electrode resistance value (R25) increased by 9 to 27% in 1000 hours in the Comparative Example, whereas the electrode resistance value (R25) hardly increased even after the voltage was applied for 1000 hours in Example 1 of the present invention.

In addition, using a sensor according to Example 2 in which five unit thermistors (five opposed electrode pairs) are connected in series according to the first embodiment described above, the same high temperature and humidity load test described above except applying a voltage of 2.5 V was carried out. For Comparative Example 1, the same evaluation test was carried out at a voltage of 2.5 V.

These evaluation results showed that the electrode corroded in 500 hours and the electrode resistance value (R25) increased by 27 to 45% in 1000 hours in the Comparative Example, whereas the electrode resistance value (R25) hardly increased even after the voltage was applied for 1000 hours in Example 2 of the present invention.

The technical scope of the present invention is not limited to the aforementioned embodiments, but the present invention may be modified in various ways without departing from the scope or teaching of the present invention.

For example, in each embodiment described above, although the pair of opposed electrodes are formed on the top surface of the thin film thermistor portion, the pair of opposed electrodes may be formed on the bottom surface of the thin film thermistor portion, that is, they may be formed on either surface of the insulating film and the thin film thermistor portion may be formed thereon.

REFERENCE NUMERALS 1, 21, 31, 41: temperature sensor, 2: insulating substrate, 3, 33: thin film thermistor portion, 4, 24, 34: opposed electrode, 4a: comb portion, 4b, 44b: joint, 5, 25, 35: opposed electrode pair

What is claimed is:

1. A temperature sensor comprising:
    an insulating substrate;
    a film thermistor portion made of a thermistor material formed on either side of the insulating substrate; and
    an opposed electrode pair consisting of a pair of opposed electrodes formed so as to be opposed to each other on at least either one of the top and bottom surfaces of the film thermistor portion,
    wherein a plurality of the opposed electrode pairs are provided and connected to one another in series;
    the opposed electrodes have a plurality of comb portions and joints for connecting the base ends of the plurality of comb portions; and,
    at least a part of each of the joints is formed on at least either one of the top and bottom surfaces of the film thermistor portion.

2. The temperature sensor according to claim 1, wherein the insulating substrate is an insulating film, and
    a plurality of the film thermistor portions are formed so as to be spaced apart from one another and one of the opposed electrode pairs is provided for each of the film thermistor portions.

3. The temperature sensor according to claim 1, wherein the adjacent opposed electrode pairs are connected through the same one joint shared by the pairs.

4. The temperature sensor according to claim 2, wherein the adjacent opposed electrode pairs are connected through the same one joint shared by the pairs.

* * * * *